(12) United States Patent
McCarthy et al.

(10) Patent No.: US 9,104,324 B2
(45) Date of Patent: Aug. 11, 2015

(54) MANAGING HOST LOGINS TO STORAGE SYSTEMS

(75) Inventors: John G. McCarthy, Ft Collins, CO (US); Jeffrey DiCorpo, Cupertino, CA (US); Shiraz Billimoria, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2828 days.

(21) Appl. No.: 11/506,313

(22) Filed: Aug. 19, 2006

(65) Prior Publication Data

US 2008/0046991 A1    Feb. 21, 2008

(51) Int. Cl.
*H04L 29/06* (2006.01)
*G06F 3/06* (2006.01)

(52) U.S. Cl.
CPC ............ *G06F 3/0637* (2013.01); *G06F 3/0605* (2013.01); *G06F 3/067* (2013.01)

(58) Field of Classification Search
CPC ...... G06F 3/0605; G06F 3/067; G06F 3/0637
USPC .......................................................... 726/11
See application file for complete search history.

(56) References Cited

U.S. PATENT DOCUMENTS

| | | | |
|---|---|---|---|
| 7,185,192 B1* | 2/2007 | Kahn | 713/155 |
| 2002/0049825 A1* | 4/2002 | Jewett et al. | 709/215 |
| 2002/0188733 A1* | 12/2002 | Collins et al. | 709/229 |
| 2003/0196055 A1* | 10/2003 | Kamano et al. | 711/163 |
| 2005/0257013 A1* | 11/2005 | Ma | 711/151 |
| 2006/0013128 A1* | 1/2006 | Connor et al. | 370/229 |

OTHER PUBLICATIONS

Strategic Profile: Storage Networking, the Next Network. Copyright © 2000 Strategic Research Corporation.*

* cited by examiner

*Primary Examiner* — Yin-Chen Shaw
*Assistant Examiner* — Narciso Victoria
(74) *Attorney, Agent, or Firm* — Philip S. Lyren

(57) ABSTRACT

Embodiments include methods, apparatus, and systems for managing host logins to storage systems. One method of software execution includes applying different management rules to authorized hosts and non-authorized hosts that are accessing a storage device in a storage area network (SAN) in order to prevent one of the non-authorized hosts from prematurely causing one of the authorized hosts to logout from the storage device

18 Claims, 3 Drawing Sheets

MANAGING HOST LOGINS TO STORAGE SYSTEMS

BACKGROUND

Storage area networks (SANs) enable initiators or host computers to login to storage devices and perform a sequence of commands, such as inquiries, report logical unit numbers (LUNs), read, write, etc. Some hosts logout when the command sequence has completed. Other hosts, however, do not logout even when the command sequences are finished. Storage devices have limited resources for processing host logins and thus limit how many active hosts are logged in at any one time.

Some storage devices have methods of managing the number of host logins. A least recently used (LRU) algorithm is one method for managing host logins. In this method, hosts are managed according to "first in first out" (FIFO) rules. When the login capacity is full and a new host is attempting to login, the oldest host is removed.

Historically, the LRU algorithm has been sufficient for some SANs. However, as fibre channel (FC) SANs have grown in maturity and the number of hosts and storage devices connected to the SAN has increased, the LRU algorithm is not effective for managing host logins. Specifically, such LRU algorithms provide equal treatment and access to hosts authorized to perform read/write operations and hosts authorized to access the storage device but not perform such read/write operations. Some host do not have read/write access to the storage device, but still need to login into the storage device and perform a limited subset of commands, such as inquiry, report LUNs, mode/log sense, etc. These hosts are referred to as non-authorized.

One problem occurs when a large number of non-authorized hosts login and cause authorized hosts to be prematurely retired from the storage device. In some instances, FC SANs experience large numbers of simultaneous login attempts or login storms. During these login storms, numerous hosts simultaneously attempt to login in as the result of a scheduled process running at some frequency or as a result of an event or perturbation in the SAN (example, a change notification from the fabric due to a node either connecting or disconnecting from the fabric/switch). During these login storms, authorized hosts are retired from the storage device or restricted from timely accessing the storage device.

DETAILED DESCRIPTION

Embodiments in accordance with the present invention are directed to apparatus, systems, and methods for managing hosts logging to one or more storage devices and/or storage area networks (SANs). In one exemplary embodiment, the storage device maintains a list of host and respective privileges for the hosts. Each host is classified as being authorized or non-authorized. Authorized hosts are managed and granted access according to one set of rules, and non-authorized hosts are managed and granted access according to a different set of rules.

One exemplary embodiment uses a static approach to manage host logins. The storage device or SAN maintains two active hosts lists (AHLs). One AHL is maintained for authorize hosts and another AHLs maintained for non-authorized hosts. Each AHL is subject to separate and different LRU management rules. Further, resources for managing the authorized and non-authorized hosts are divided. For instance, the LRU manages rules for authorized hosts that process a relatively larger number of requests, such as a static number or quantity (example, 90% to 95%) of the sum total of hosts that can be logged into the storage device. By contrast, the LRU also manages rules for non-authorized hosts that process a relatively smaller number of hosts, example 5% to 10% or the remainder not utilized by the authorized hosts.

Exemplary embodiments prevent non-authorized hosts from causing or forcing authorized hosts to prematurely or unnecessarily logout from the storage device. At the same time, a relatively small number of non-authorized hosts are permitted to login or remain logged in. Thus, non-authorized hosts are permitted to login, execute commands, and then become a candidate for aged-off (i.e., removed) from the non-authorized host AHL through the LRU.

Another exemplary embodiment uses a dynamic approach to manage host logins. As with the static approach, the storage device or SAN maintains one or more active hosts lists (AHLs) storing both the authorized and non-authorized hosts. Each AHL is subject to separate and different LRU management rules. Further, resources for managing the authorized and non-authorized hosts are divided. For instance, the LRU manages dynamic and adaptive rules for authorized and non-authorized hosts. In one embodiment, the management rules change in real-time to accommodate different host request scenarios and conditions. For instance, the number of authorized and non-authorized hosts permitted to access a storage device changes to accommodate a surge or surplus of authorized and/or non-authorized hosts. As another example, some authorized hosts are provide with unique or special access privileges that are not provided to other authorized or non-authorized hosts.

Figure 1:
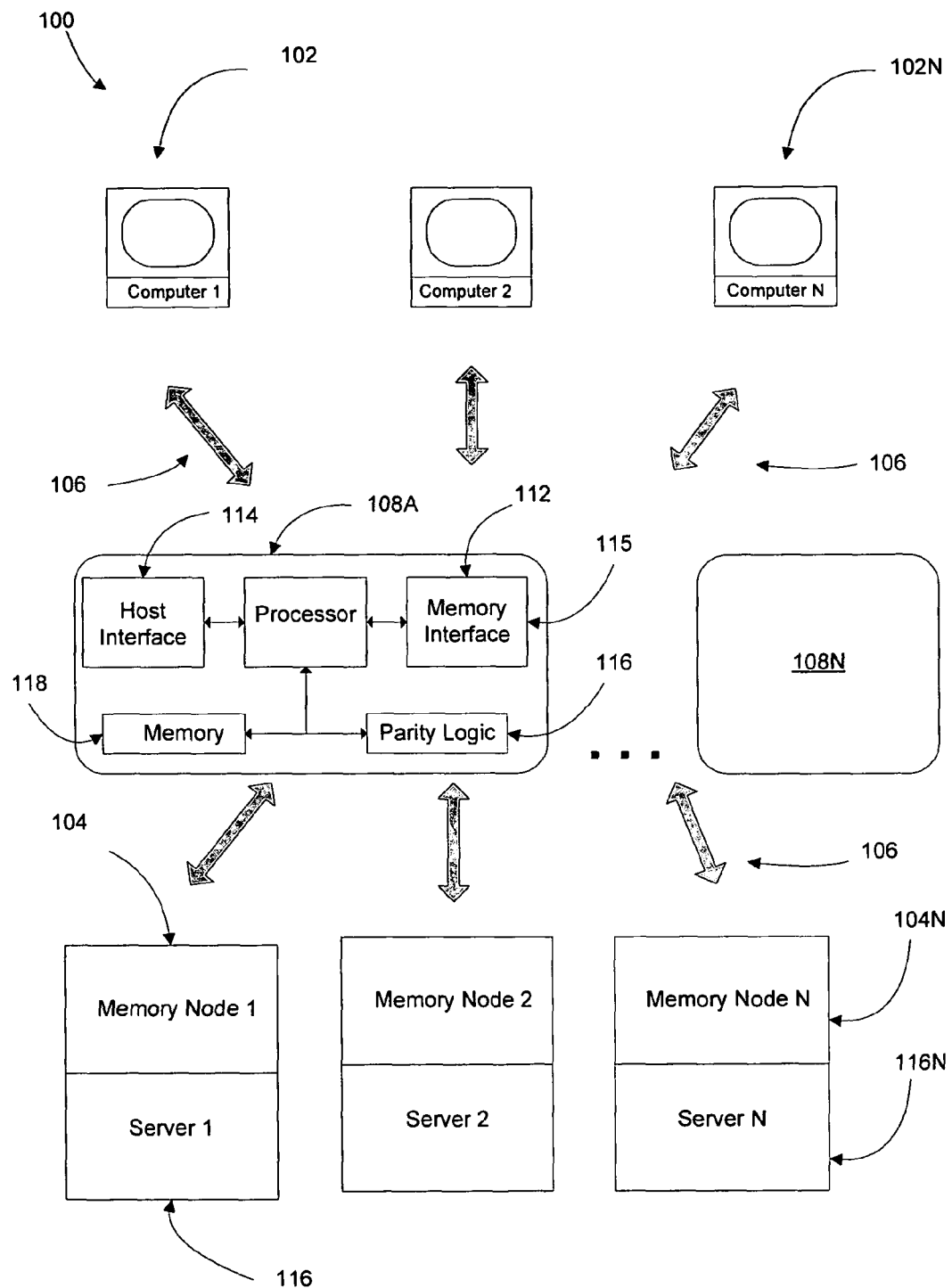
FIG. 1 is an exemplary block diagram for a storage system in accordance with an exemplary embodiment of the present invention.

FIG. 1 is a block diagram of an exemplary file system. By way of illustration, a distributed file system or distributed storage system (DSS) 100 with centralized control is shown as an exemplary embodiment. The DSS 100 includes a plurality of computers 102 (of which computer 1 to computer N are exemplary) and a plurality of storage or memory nodes 104 (of which node 1 to node N are exemplary) interconnected by one or more networks 106 to one or more storage controllers 108 (of which storage controllers 108A to 108N are exemplary).

The computers 102 are used by a human operator or by some software system. More specifically, computers 102 are systems that are capable of and intended for use in processing application software (example, one or more programs designed for end users or host systems).

Memory nodes 104 are network attached devices providing random access memory (RAM) and/or disk space (for storage and as virtual RAM) and/or some other form of storage such as tapes, micromechanical systems (MEMS), optical disks or the like, for use by the computers 102. Typically, the memory nodes include larger amounts of RAM and/or disk space than are available at computers 102. Memory nodes also include more specialized devices, such as network disk drives or disk drive arrays, (example, redundant array of independent disks (RAID)), high speed tape, magnetic random access memory (MRAM) systems or other devices, and combinations thereof. In one exemplary embodiment, the memory nodes are separate and independent disk arrays. In another exemplary embodiment, the memory nodes include or couple to one or more servers 116 (of which servers 1 to server N are exemplary).

The storage controller 108 manages various data storage and retrieval operations. Storage controller 108 receives data read requests and data write requests from one or more computers 102 and is coupled to multiple memory nodes 104. Storage controller 108 handles the storage and retrieval of data on the multiple memory nodes 104. In one exemplary embodiment, storage controller 108 is a separate device or may be part of a computer system, such as a server. Additionally, memory nodes 104 are located in the same device as storage controller 108 or in one or more separate devices coupled to storage controller 108. In one embodiment, memory nodes 104 have approximately equal storage capacities.

The storage controller 108 includes a processor 112 that performs various operations and tasks necessary to manage the various data storage and data retrieval requests received from computers 102. Processor 112 is coupled to a host interface 114 that provides a bidirectional data communication interface to one or more computers 102. Processor 112 is also coupled to a memory interface 115 that provides a bidirectional data communication interface to multiple memory nodes 104. Parity logic 116 is coupled to processor 112 and provides processor 112 with the logic necessary to generate parity information and reconstruct lost data based on parity information. Parity logic 116 includes multiple types of parity logic depending on the types of parity supported by storage controller 108. For example, parity logic 116 includes information regarding different redundant array of independent disks (RAID) levels that are supported by storage controller 108. Memory 118 is also coupled to processor 112 and stores various information used by processor 112 when carrying out its tasks. By way of example, memory 118 includes one or more of volatile memory, non-volatile memory, or a combination of volatile and non-volatile memory.

Moreover, whereas in a shared memory system or a distributed memory system, the networked nodes are not differentiated to be either computers or memory nodes, as implied by the figures, memory nodes 104 and computers 102 are distinct in at least one embodiment. In other words, in at least one embodiment, the computers 102 and memory nodes 104 are different and separate discrete elements. In certain embodiments, at least some computers 102 and memory nodes 104 are co-located, such as in a rack or even within the same system box. However, it is understood and appreciated that at least one computer 102 is logically separate from at least one other memory node 104. Further, in at least one embodiment, at least one computer 102 is physically separate from at least one memory node 104.

In at least one embodiment, the controller is implemented as a method stored on a computer-readable medium as a computer program. The form of the medium and the language of the program are understood to be appropriate for the computers 102 and memory nodes 104.

In at least one embodiment, the memory nodes 104 are made fault tolerant by using existing replication, disk logging, and disk imaging systems and methods. Replication provides high availability when few memory nodes 104 crash, and the maximum number of memory node crashes tolerated in DSS 100 depend on the degree of replication.

Figure 2:
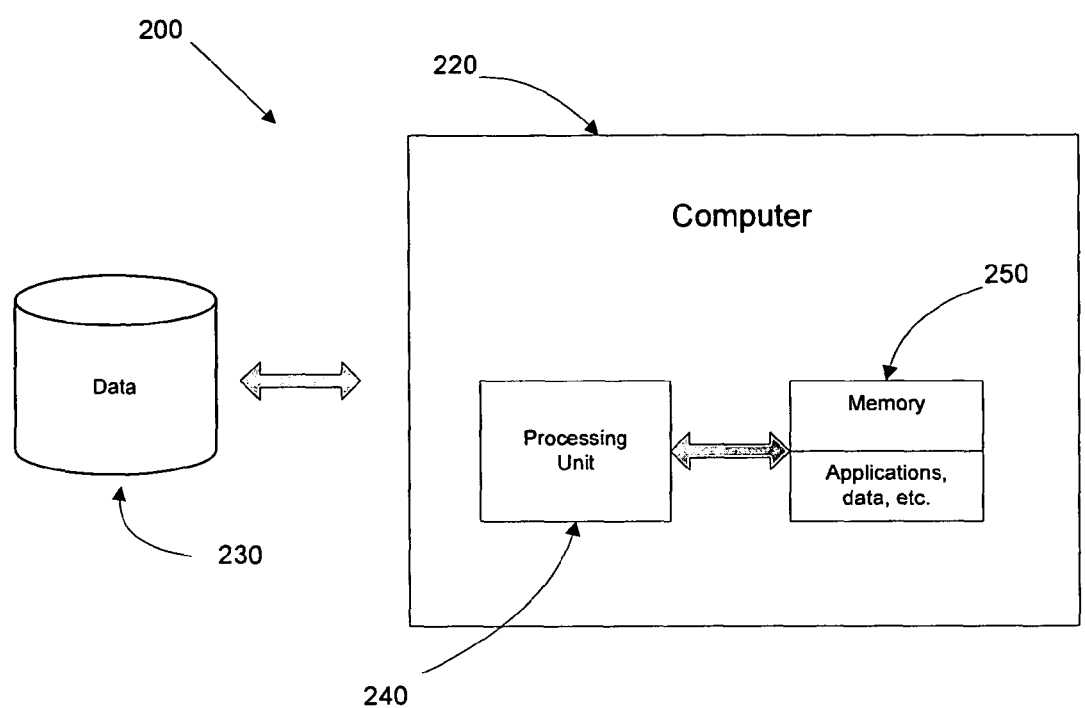
FIG. 2 is a block diagram of an exemplary computer system in accordance with an exemplary embodiment of the present invention.

Embodiments in accordance with the present invention are utilized in or include a variety of systems, methods, and apparatus. FIG. 2 illustrates an exemplary embodiment as a computer system 200 for being or utilizing one or more of the computers 102, memory nodes 104, methods, flow diagrams and/or aspects of exemplary embodiments in accordance with the present invention.

The system 200 includes a computer 220 (such as a host or client computer) and a repository, warehouse, or database 230. The computer 220 comprises a processing unit 240 (such as one or more processors of central processing units, CPUs) for controlling the overall operation of memory 250 (such as random access memory (RAM) for temporary data storage and read only memory (ROM) for permanent data storage). The memory 250, for example, stores applications, data, control programs, algorithms (including diagrams and methods discussed herein), and other data associate with the system 220. The processing unit 240 communicates with memory 250 and data base 230 and many other components via buses, networks, etc.

Embodiments in accordance with the present invention are not limited to any particular type or number of databases and/or computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

In further exemplary embodiments, the hosts have different memory sizes and processors and run different operating systems. Further, such hosts can be general purpose computers, appliances, or components of a general purpose computer.

The network connecting computers 102 and memory nodes 104 are any medium, device, or mechanism that allows nodes to communicate. Further, these nodes are not required to be homogenous or unique. Multiple different networks can connect the nodes, where each network has different characteristics. For example, one network uses wires, another uses radio transmissions, etc. Further, portions of the networks can have different bandwidths, latencies, packet sizes, access mechanisms, reliability protocols, and ordering guarantees, to name a few examples.

Figure 3:
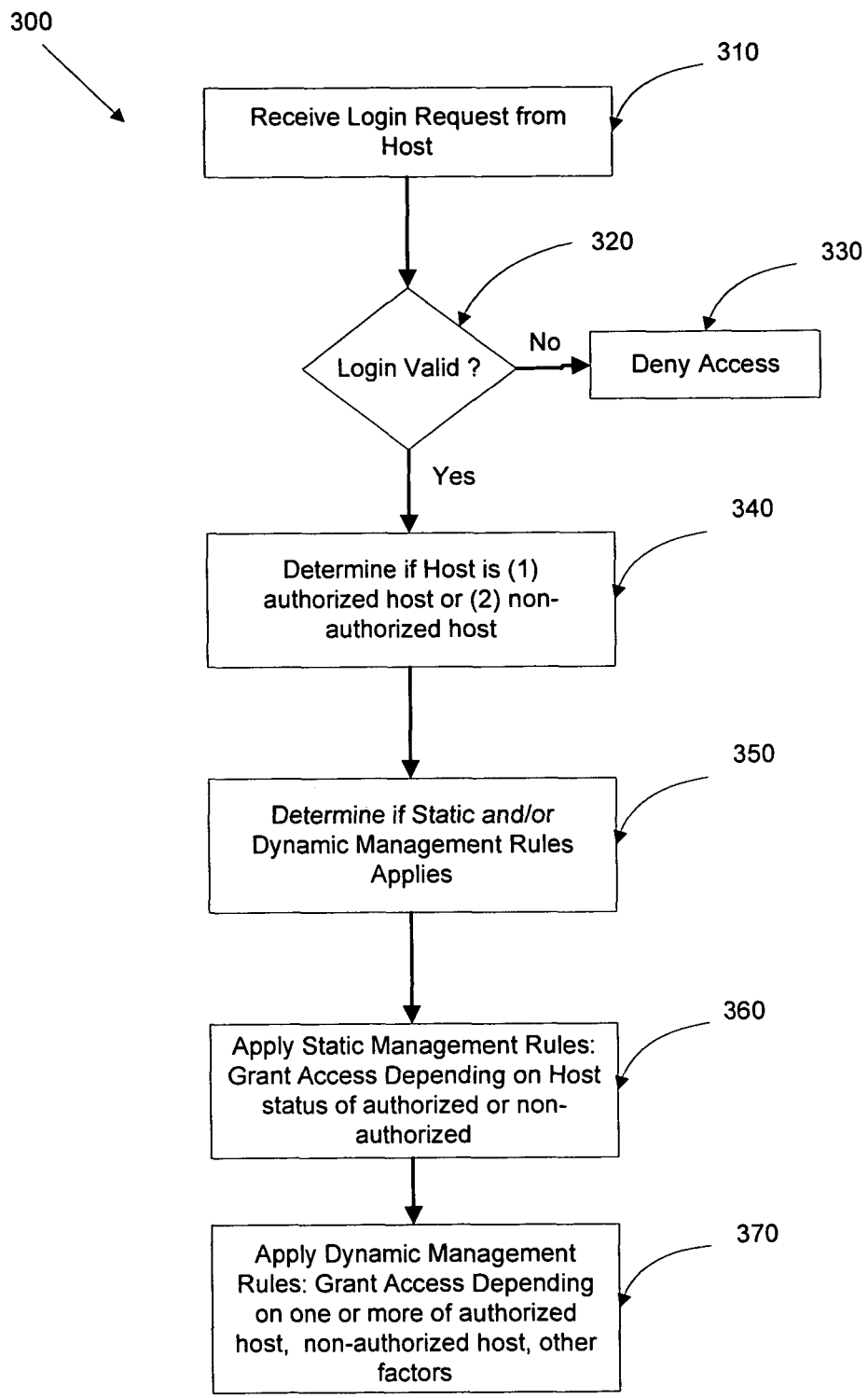
FIG. 3 is an exemplary flow diagram for managing hosts accessing a storage device in a storage area network (SAN) in accordance with an exemplary embodiment of the present invention.

FIG. 3 illustrates an exemplary flow diagram 300 for managing one or more hosts accessing a storage device in a storage area network (SAN) in accordance with an exemplary embodiment of the present invention. According to block 310, one or more storage devices or SANs receive one or more login requests from one or more hosts. According to block 320, a question is asked: Is the login request valid? If the answer to this question is "no," then flow proceeds to block 330 and access is denied. If the answer to this question is "yes," then flow proceeds to block 340.

According to block 340, a determination is made as to whether the host is either an authorized host or a non-authorized host. For instance, the storage device maintains a list of authorized and non-authorized hosts that are permitted to access the storage device. In one exemplary embodiment, access controls are used to restrict which hosts have read/write privileges to the storage device. As used herein authorized hosts have both read and write privileges to the storage device; and non-authorized hosts do not have read and write privileges. Although non-authorized hosts do not have read/write access, they still are able to login to the storage device and perform various commands, such as, but not limited to, one or more of storage device and SAN inquiries, report LUNs, mode/log sense, etc.

In one exemplary embodiment, due to finite resources within the storage device or SAN, a drive has a limit as to how many active hosts (i.e., hosts that are still logged in) are provided access at any one time. The active hosts are tracked on an active host list (AHL). Preferably, authorized hosts have preferential access rights and privileges over non-authorized hosts on the AHL.

According to block 350, a determination is made as to whether static and/or dynamic management rules apply. In one exemplary embodiment, static management rules are applied as a default or until the dynamic management rules are triggered with a triggering event, such as, but not limited to, a number of new login requests exceeds a predetermined threshold. For example, a storage device can be subject to a surge of authorized or non-authorized login attempts.

According to block 360, the static management rules are applied to hosts logging in to a storage device. Access to the storage device depends on the status of the hosts as being classified as an authorized host or non-authorized host. The storage device or SAN maintains one or more AHLs for both authorize hosts and non-authorized hosts. Each AHL is subject to separate and different LRU management rules. Further, resources for managing the authorized and non-authorized hosts are divided or separate. For instance, the LRU manages rules for authorized hosts that process a relatively larger number of hosts, example a static number or quantity (example, 90% to 95%) of the sum total of hosts that can be logged in to the storage device. By contrast, the LRU manages rules for non-authorized hosts that process a relatively smaller number of hosts, example 5% to 10% or the remainder not utilized by the authorized hosts.

According to block 370, the dynamic management rules are applied to hosts logging in to a storage device. Access to the storage device depends on or more of the status of the hosts as being classified as an authorized host or non-authorized host, and other factors (discussed herein). As with the static approach, the storage device or SAN maintains one or more active hosts lists (AHLs) storing both the authorized and non-authorized hosts. Each AHL (or portions therein directed to authorized and non-authorized hosts) is subject to separate and different LRU management rules. Further, resources for managing the authorized and non-authorized hosts are divided. For instance, the LRU manages rules for authorized and non-authorized hosts, and these rules are dynamic and adaptive to system changes. In one embodiment, the management rules change in real-time to accommodate different host request scenarios and conditions. For instance, the number of authorized and non-authorized hosts permitted to access a storage device changes to accommodate a surge or surplus of authorized and/or non-authorized hosts. As another example, some authorized hosts are provided with unique or special access privileges that are not provided to other authorized or non-authorized hosts.

In one exemplary embodiment, authorized and/or non-authorized hosts are provided priority based on a number of previous login attempts. By way of example, if authorized host A has three login attempts and authorized host B has one login attempt, then host A is provided priority over host B. This priority scheme is also applicable to non-authorized hosts. In other words, a first non-authorized host is given priority to login over a second non-authorized host if the first non-authorized host has a greater number of login attempts than the second non-authorized host.

Authorized and non-authorized hosts are treated as special or provided priority based on other factors as well. For instance, hosts associated with or providing business critical activities are given priority over other hosts. As another example, hosts are provided access privileges based on different access rights of LUNs. These access privileges can be provided with different priorities. By way of illustration, host A has access to LUNs 1-10 with priority #1: host B has access to LUNs 11-20 with priority #2, host C has access to LUNs 1-20 with priority #1; host D has access to LUNs 21-35 with priority #3; etc. If priority #1 trumps or exceeds priority #2, then host A has priority to access over host D since host A has priority #1 and host D has priority #3. Such access privileges also apply to non-authorized hosts.

As yet another example, the number or quantity of authorized and non-authorized hosts that are able to login is varied. This number or quantity can vary depending on, for example, a number of new login requests, a percentage of authorized or non-authorized hosts already logged in, etc. By way of example, assume an initial static allocation provides 90% to authorized hosts and 10% to non-authorized hosts. If a relatively large surge or surplus of non-authorized hosts login attempts occurs, then the allocation is adjusted to accommodate the non-authorized hosts. For example, the 90% allocation for authorized hosts is decreased, and the 10% allocation for non-authorized hosts is increased.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in flow diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of software execution, comprising:
   providing a first set of management rules to authorized hosts that are logged into a storage device in a storage area network (SAN);
   providing a second set of management rules to non-authorized hosts that are logged into the storage device while the authorized hosts are logged into the storage device, wherein the first and second sets of management rules allow a larger number of the authorized hosts to be logged into the storage device than the non-authorized hosts logged into the storage device, and the authorized hosts have both read and write privileges to the storage device and the non-authorized hosts do not have read and write privileges to the storage device;
   identifying a number of non-authorized hosts allowed to access the storage device;
   automatically changing the first and second sets of management rules to allow more non-authorized hosts to access the storage device in response to a surge of login requests received for the storage device, wherein the surge of login requests includes a number of hosts simultaneously accessing the storage device exceeding a threshold; and
   managing access by the authorized hosts and the number of identified non-authorized hosts of the storage device based on the changed first and second sets of management rules.

2. The method of claim 1 further comprising, maintaining a first host list for authorized hosts to perform read/write operations to the storage device and a second host list for non-authorized hosts not permitted to perform read/write operations.

3. The method of claim 1 further comprising:
   receiving login requests from hosts to access the storage device;
   determining if the hosts from which the login requests are received are authorized to perform read/write operations to the storage device.

4. The method of claim 1 further comprising, allocating a first predetermined amount of resources to the authorized hosts and a second predetermined amount of resources to the non-authorized hosts, wherein the second predetermined amount of resources is less than the first predetermined amount of resources.

5. The method of claim 1 further comprising, establishing a hierarchy of plural different privileges that govern when one authorized host has access priority to the storage device over another authorized host.

6. The method of claim 1 further comprising, prioritizing access to hosts based on a number of access requests to the storage device.

7. A non-transitory computer readable medium having instructions for causing a computer to execute a method, comprising:
   maintaining a list of hosts that are logged in to a storage device in a storage area network (SAN), wherein the list includes hosts that are logged into the storage device and authorized to perform read/write operations to the storage device and hosts that are logged into the storage device but not authorized to perform read/write operations to the storage device;
   prioritizing access to requesting hosts to join the list by providing a first set of privileges to a first subset of the requesting hosts that are authorized to perform read/write operations to the storage device and by providing a second set of privileges to a second subset of the requesting hosts that are not authorized to perform read/write operations to the storage device, wherein the prioritizing access comprises using the first and second sets of privileges to allow a larger number of the requesting hosts in the first subset that are authorized to perform read/write operations to be logged into the storage device than the requesting hosts in the second subset not authorized to perform read/write operations to be logged into the storage device; and
   based on the first and second sets of privileges, managing access by the requesting hosts, including the larger number of the requesting hosts in the first subset, of the storage device.

8. The non-transitory computer readable medium of claim 7 further comprising, increasing a number of non-authorized hosts allowed to access the storage device when a surge of non-authorized hosts attempt to access the storage device.

9. The non-transitory computer readable medium of claim 7 further comprising, altering numbers of both authorized and non-authorized hosts having permission to access the storage device when a total number of hosts logged to the storage device exceeds a threshold.

10. A non-transitory computer readable medium having instructions for causing a computer to execute a method, comprising:
    maintaining a list of hosts that are logged in to a storage device in a storage area network (SAN), wherein the list includes hosts that are logged into the storage device and authorized to perform read/write operations to the storage device and hosts that are logged into the storage device but not authorized to perform read/write operations to the storage device;
    prioritizing access to requesting hosts to join the list by providing a first set of privileges to a first subset of the requesting hosts that are authorized to perform read/write operations to the storage device and by providing a second set of privileges to a second subset of the requesting hosts that are not authorized to perform read/write operations to the storage device;
    adjusting, in response to access by the requesting hosts to the storage device granted by the prioritizing access, existing rules that govern when a host is removed from the list after a number of hosts logged into the storage device exceeds a predetermined threshold; and
    managing access by the requesting hosts of the storage device based on the adjusted existing rules.

11. A non-transitory computer readable medium having instructions for causing a computer to execute a method, comprising:
    maintaining a list of hosts that are logged in to a storage device in a storage area network (SAN), wherein the list includes hosts that are logged into the storage device and authorized to perform read/write operations to the storage device and hosts that are logged into the storage device but not authorized to perform read/write operations to the storage device;

prioritizing access to requesting hosts to join the list by providing a first set of privileges to a first subset of the requesting hosts that are authorized to perform read/write operations to the storage device and by providing a second set of privileges to a second subset of the requesting hosts that are not authorized to perform read/write operations to the storage device;

preventing a non-authorized host of the requesting hosts from prematurely causing an authorized host to be removed from the list and logged out from the storage device; and managing access by the first subset of the requesting hosts and the second subset of the requesting hosts of the storage device based on the first and second sets of privileges.

12. The non-transitory computer readable medium of claim 11 further comprising, denying login access to a host authorized to perform read and write operation on the storage device while granting login access to a host not authorized to perform the read and write operations on the storage device.

13. The non-transitory computer readable medium of claim 11 further comprising, giving login priority to hosts that have more than one login attempt to the storage device.

14. A computer system, comprising:
a memory for storing instructions; and
a processor for executing the instructions to:
receive first and second access rules;
apply the first access rules to authorized hosts permitted to perform read and write operations while logged in to a storage device in a storage area network (SAN) and the second access rules to non-authorized hosts also logged in to the storage device but not permitted to perform read and write operations, wherein the first and second access rules allow a larger number of the authorized hosts to be logged into the storage device than a number of the non-authorized hosts logged into the storage device;
prevent, using the first and second access rules, one of the non-authorized hosts from prematurely causing one of the authorized hosts to logout from the storage device while both authorized and non-authorized hosts are logged in to the storage device; and
manage access by the authorized and non-authorized hosts to the storage device based on the first and second access rules.

15. The computer system of claim 14, wherein the memory stores a list of hosts classified as being authorized to perform the read and write operations and a list of hosts classified as being non-authorized to perform the read and write operations.

16. The computer system of claim 14, wherein the processor is to further execute the instructions to adjust a number of authorized hosts allowed to access the storage device when a number of hosts simultaneously accessing the storage device exceeds a threshold.

17. The computer system of claim 14, wherein the processor is to further execute the instructions to increase a number of non-authorized hosts permitted to access the storage device when a number of authorized hosts having access to the storage device falls below a predetermined threshold.

18. A computer system, comprising:
a memory for storing instructions; and
a processor for executing the instructions to:
receive first and second access rules;
apply the first access rules to authorized hosts permitted to perform read and write operations while logged in to a storage device in a storage area network (SAN) and the second access rules to non-authorized hosts also logged in to the storage device but not permitted to perform read and write operations, wherein the first and second access rules allow a larger number of the authorized hosts to be logged into the storage device than a number of the non-authorized hosts logged into the storage device;
prevent, using the first and second access rules, one of the non-authorized hosts from prematurely causing one of the authorized hosts to logout from the storage device while both authorized and non-authorized hosts are logged in to the storage device;
identify a number of non-authorized hosts allowed to access the storage device; and
automatically change the first and second access rules to allow more non-authorized hosts to access the storage device in response to a surge of login requests received for the storage device, wherein the surge of login requests includes a number of hosts simultaneously accessing the storage device exceeding a threshold; and
manage access by the authorized hosts and the number of identified non-authorized hosts to the storage device based on the changed first and second access rules.

* * * * *